United States Patent
Zakowski et al.

(10) Patent No.: US 8,742,297 B2
(45) Date of Patent: Jun. 3, 2014

(54) BOTTLE WARMING DEVICE

(75) Inventors: Joseph Zakowski, New Canaan, CT (US); Caitlin Bart, Stamford, CT (US)

(73) Assignee: Conair Corporation, Stamford, CT (US)

( * ) Notice: Subject to any disclaimer, the term of this patent is extended or adjusted under 35 U.S.C. 154(b) by 0 days.

(21) Appl. No.: 13/611,623

(22) Filed: Sep. 12, 2012

(65) Prior Publication Data

US 2014/0072287 A1   Mar. 13, 2014

(51) Int. Cl.
*F24C 7/10* (2006.01)
*A01K 63/06* (2006.01)

(52) U.S. Cl.
USPC .......................... 219/386; 392/444; 392/445

(58) Field of Classification Search
USPC ............... 219/385–388, 430–442, 521–528; 392/441, 442, 444–502; 99/359, 452, 99/324, 385, 386, 387, 388; 210/619, 657, 210/241; 220/4.01, 4.29–4.33, 477, 220/532–534
See application file for complete search history.

(56) References Cited

U.S. PATENT DOCUMENTS

| | | | |
|---|---|---|---|
| 1,994,206 A | 3/1935 | Zisken et al. | |
| 2,011,869 A * | 8/1935 | Pecker | 422/304 |
| 2,536,596 A | 1/1951 | Fisher | |
| 2,582,781 A | 1/1952 | Johnson | |
| 2,604,573 A * | 7/1952 | Baile et al. | 219/473 |
| 2,843,719 A | 7/1958 | Smith et al. | |
| 2,912,115 A | 11/1959 | Robertson | |
| 3,351,239 A * | 11/1967 | Flock | 222/54 |
| 3,892,945 A | 7/1975 | Lerner | |
| 5,208,896 A * | 5/1993 | Katayev | 392/444 |
| 5,248,870 A | 9/1993 | Redal | |
| 6,234,165 B1 | 5/2001 | Creighton et al. | |
| D448,236 S | 9/2001 | Murray | |
| 6,444,956 B1 * | 9/2002 | Witcher et al. | 219/429 |
| 6,809,302 B1 | 10/2004 | Jones et al. | |
| 6,861,618 B2 | 3/2005 | Binet et al. | |
| 6,906,289 B2 * | 6/2005 | Serres Vives et al. | 219/386 |
| 8,045,848 B2 | 10/2011 | Wortley | |
| 2004/0140304 A1 * | 7/2004 | Leyendecker | 219/386 |
| 2007/0280657 A1 * | 12/2007 | Loia | 392/442 |

* cited by examiner

*Primary Examiner* — Tu B Hoang
*Assistant Examiner* — Michael LaFlame, Jr.
(74) *Attorney, Agent, or Firm* — McCormick Paulding & Huber LLP

(57) ABSTRACT

The bottle warming device of the present invention includes a housing, a heating element disposed in the housing, and a basket receivable in the housing. The basket is movable between a first position in which a bottom of the basket is positioned a first distance from a top of the housing, and a second position in which the bottom of the basket is positioned a second distance from the top of the housing, the first distance being greater than the second distance.

10 Claims, 8 Drawing Sheets

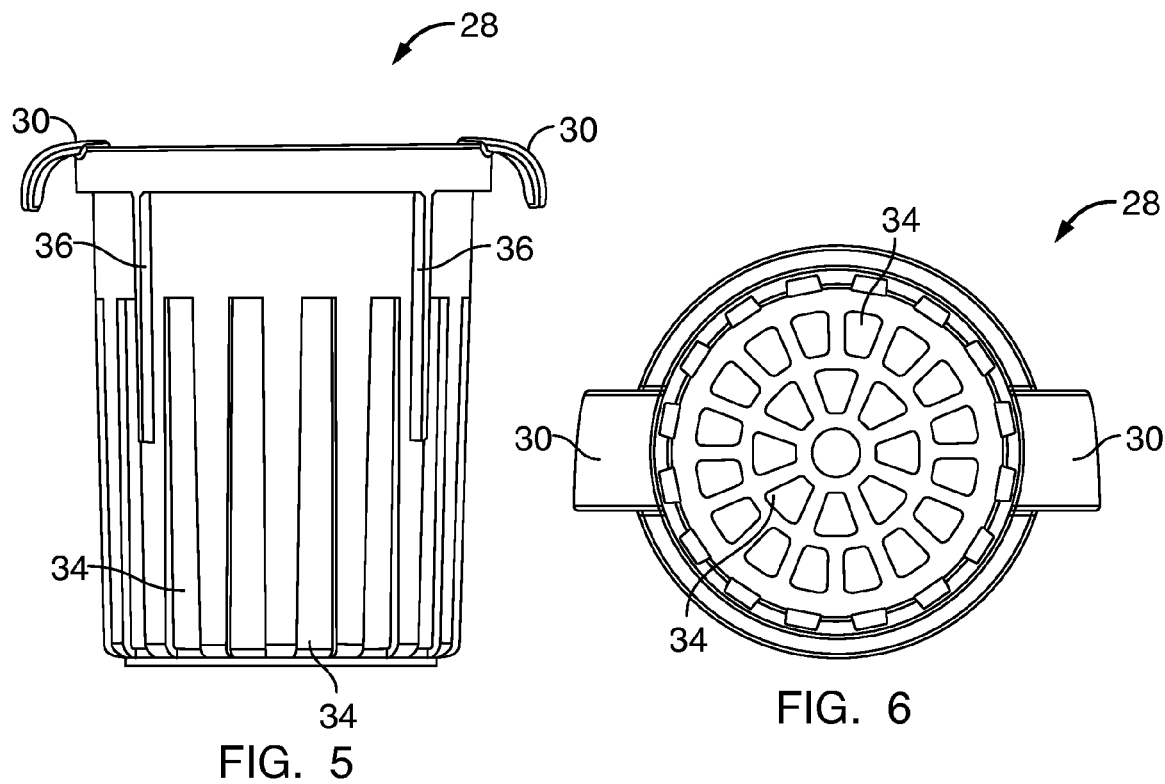
FIG. 5
FIG. 6
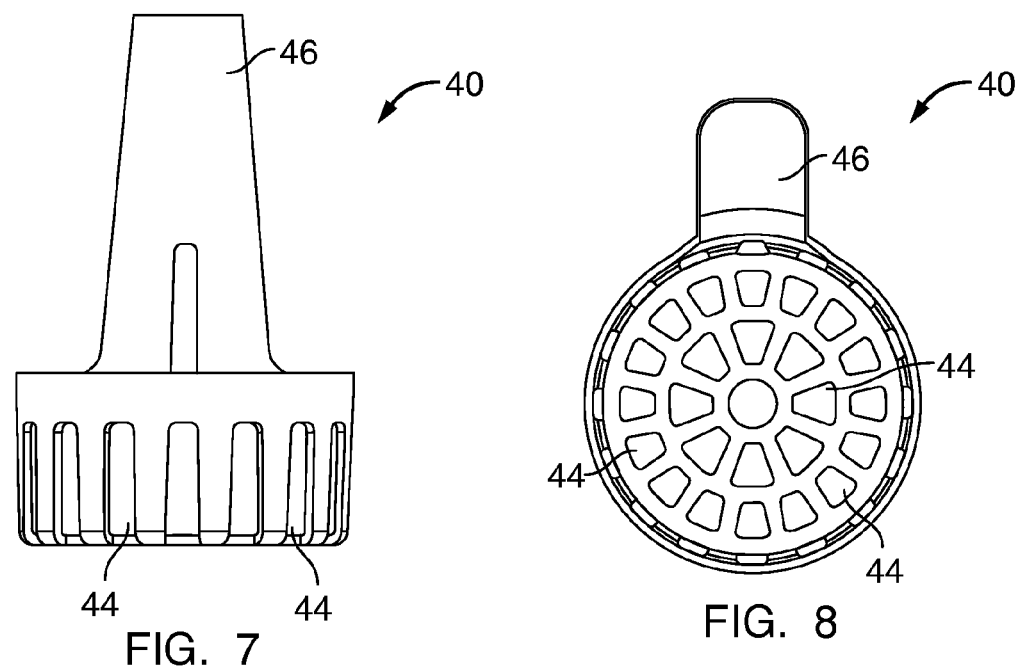
FIG. 7
FIG. 8

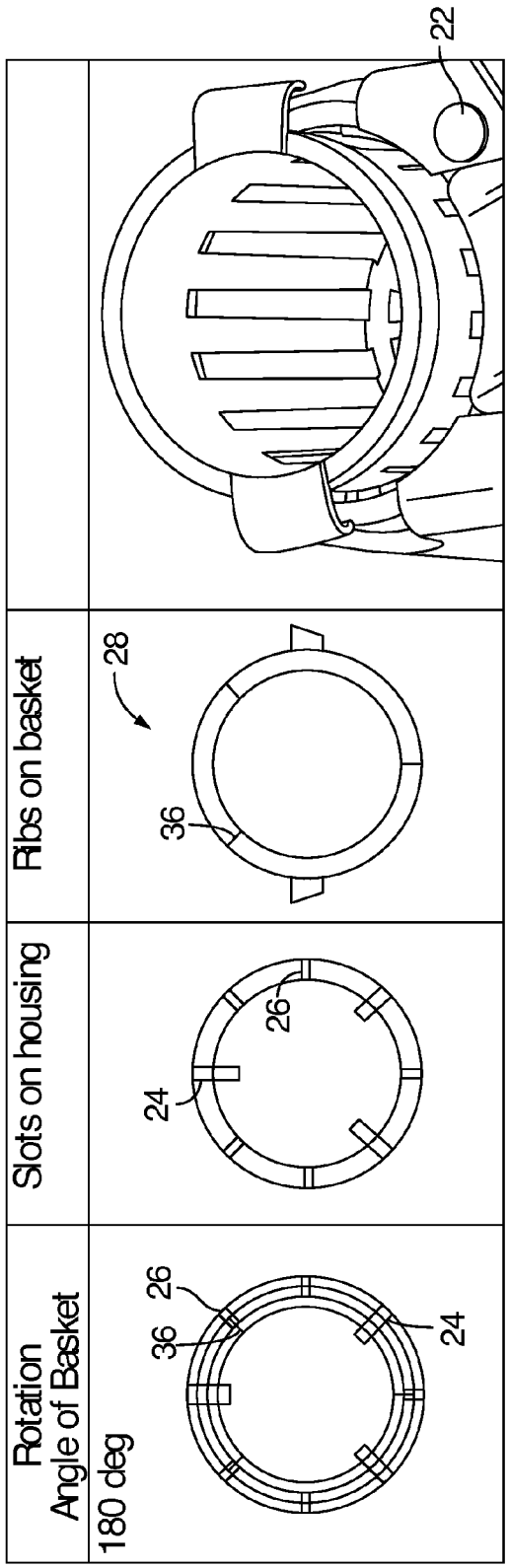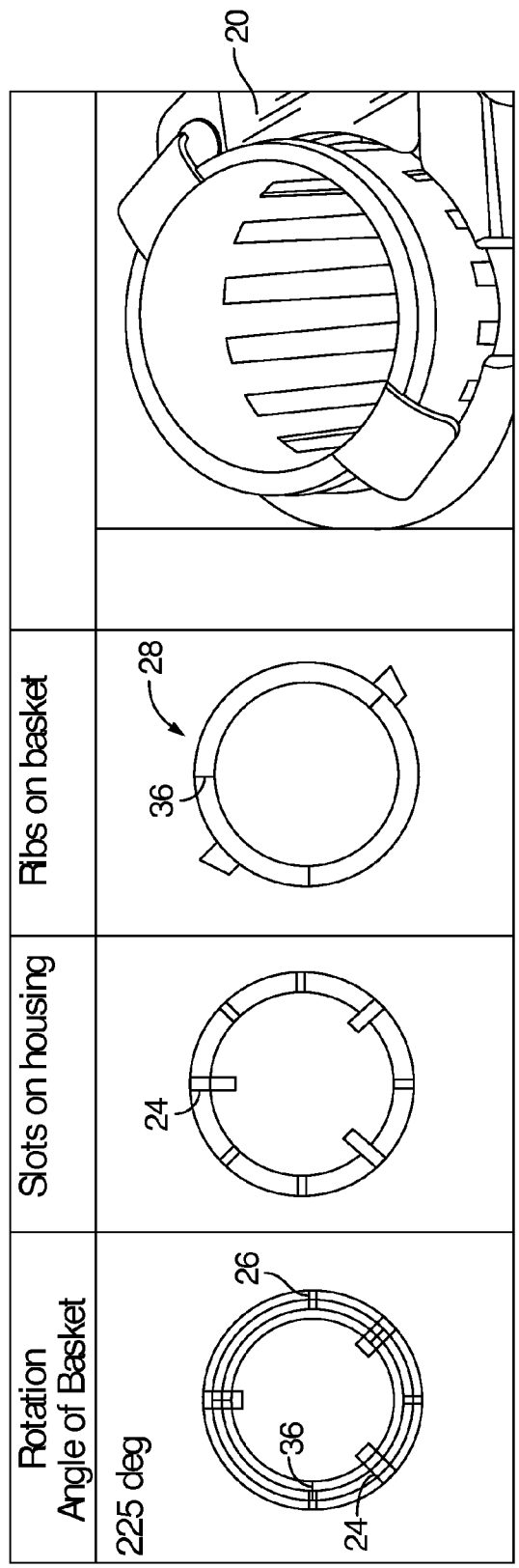

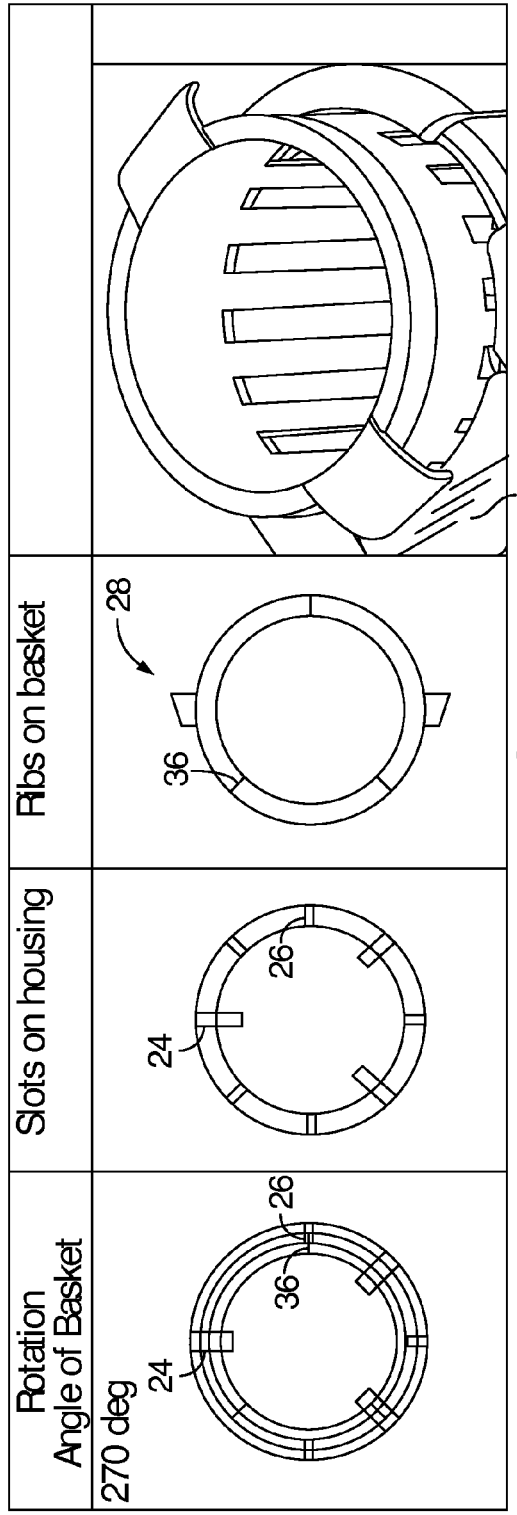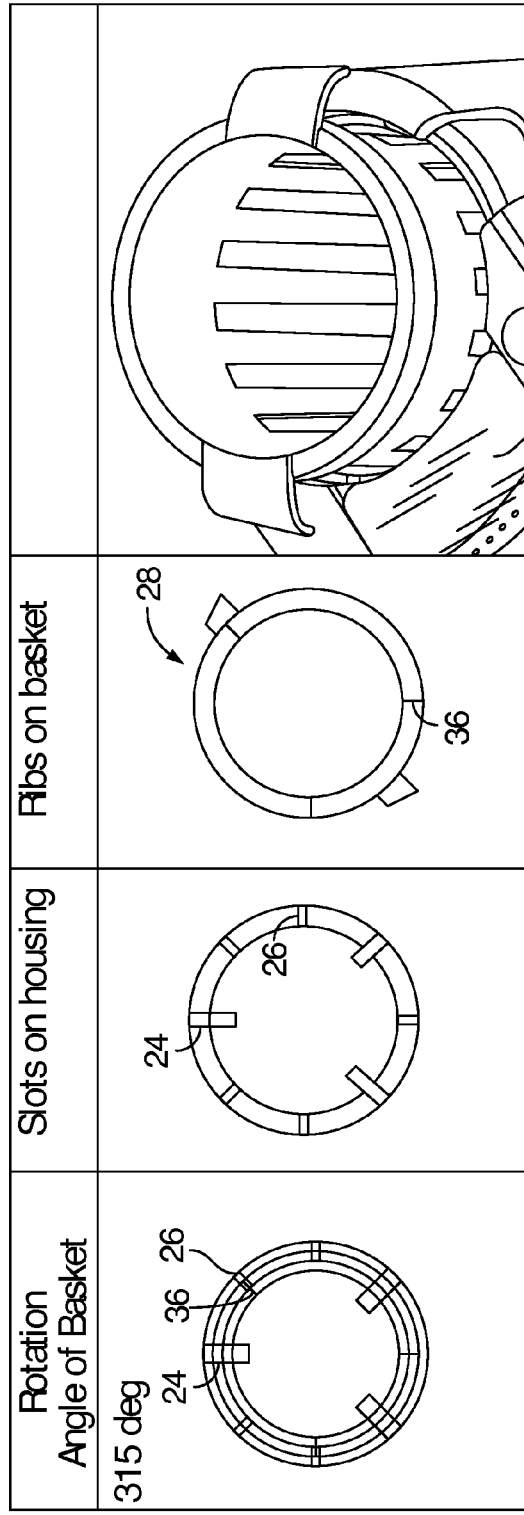

BOTTLE WARMING DEVICE

FIELD OF THE INVENTION

The present invention relates to bottle warming devices and, more particularly, to a bottle warming device capable of accommodating bottles of different sizes.

BACKGROUND OF THE INVENTION

Various devices exist for warming the contents of bottles, such a bottles containing baby milk. For example, known bottle warming devices utilize a housing containing a heated water bath and/or steam to heat the contents of a bottle placed within the housing.

While existing bottle warming devices are generally suitable for what is regarded as ordinary performance, there is room for improvement in terms of efficiency, ease of use and performance. In particular, existing bottle warming devices are not particularly suited to warming bottles of different sizes, such as baby bottles which are sold in both short and tall varieties. Moreover, existing devices are limited to warming the contents of bottles and are not well suited to warm other items such as baby food and the like.

SUMMARY OF THE INVENTION

It is an object of the present invention to provide a bottle warming device.

It is an object of the present invention to provide a bottle warming device capable of accommodating bottles of different size.

It is an object of the present invention to provide a bottle warming device that warms the contents of a bottle quickly and evenly.

It is an object of the present invention to provide a bottle warming device that steam-heats the contents of a bottle.

It is an object of the present invention to provide a bottle warming device that is capable of warming jars of baby food in addition to the contents of a bottle.

It is another object of the present invention to provide a bottle warming device having a built-in nightlight.

These and other objects are achieved by the present invention.

The bottle warming device of the present invention includes a housing, a heating element disposed in the housing, and a basket receivable in the housing. The basket is movable between a first position in which a bottom of the basket is positioned a first distance from a top of the housing, and a second position in which the bottom of the basket is positioned a second distance from the top of the housing, the first distance being greater than the second distance.

BRIEF DESCRIPTION OF THE DRAWINGS

FIG. 5 is a front elevational view of a bottle basket of the bottle warming device of FIG. 1.

FIG. 6 is a top plan view of the bottle basket of FIG. 5.

FIG. 7 is a front elevational view of a jar basket of the bottle warming device of FIG. 1.

FIG. 8 is a top plan view of the jar basket of FIG. 7.

FIG. 13 is a diagram depicting an orientation of the bottle basket at 180 degrees with respect to the housing of the bottle warming device.

FIG. 14 is a diagram depicting an orientation of the bottle basket at 225 degrees with respect to the housing of the bottle warming device.

FIG. 15 is a diagram depicting an orientation of the bottle basket at 270 degrees with respect to the housing of the bottle warming device.

FIG. 16 is a diagram depicting an orientation of the bottle basket at 315 degrees with respect to the housing of the bottle warming device.

DETAILED DESCRIPTION OF THE PREFERRED EMBODIMENTS

Figure 1:
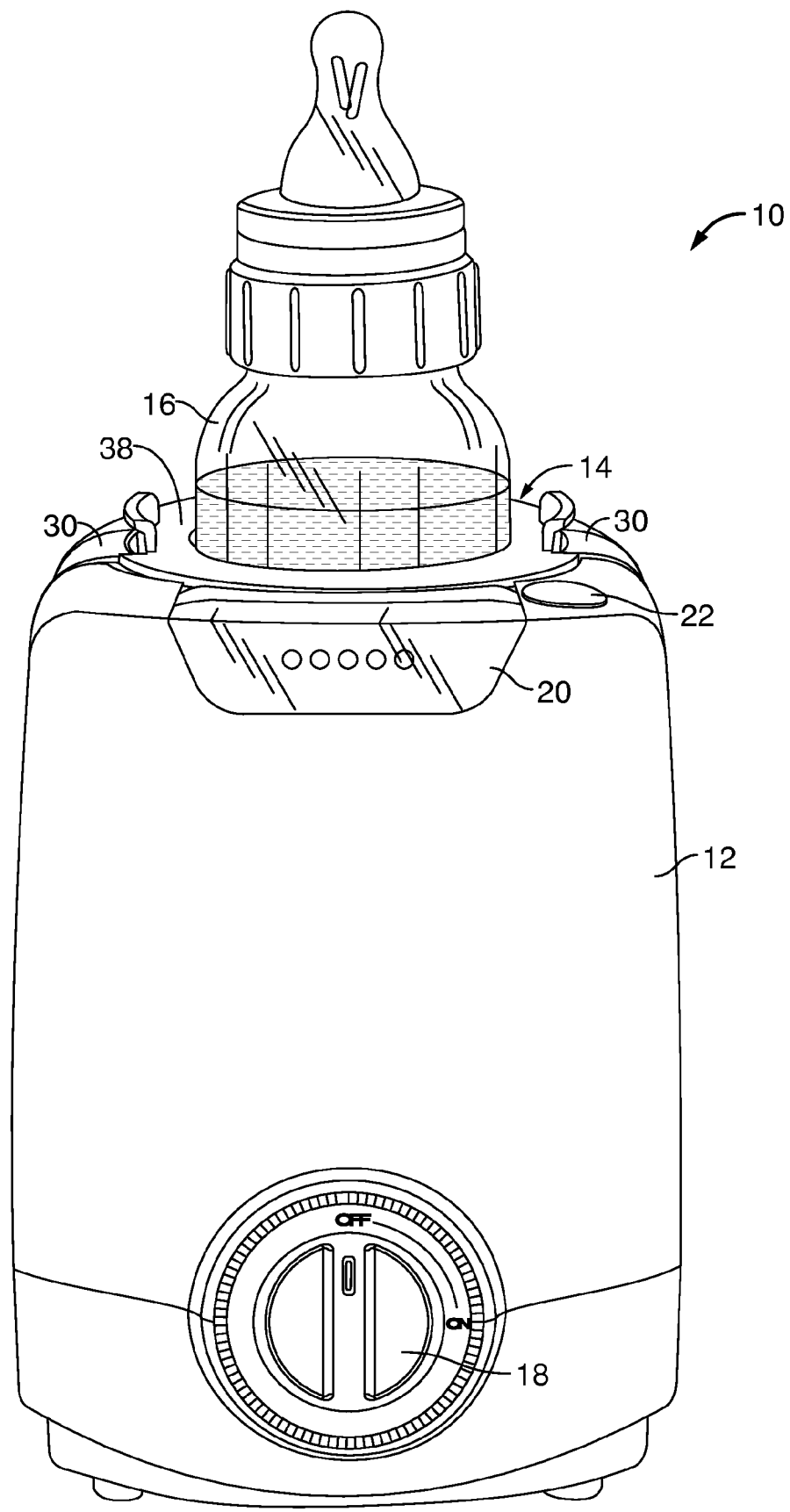
FIG. 1 is a perspective view of a bottle warming device in accordance with an embodiment of the present invention.

Referring to FIG. 1, a bottle warming device 10 is shown. The bottle warming device includes a housing 12 having a bottle-receiving opening 14 in the top thereof for receiving a bottle, such as baby bottle 16. The housing 12 is configured to hold a volume of water in the bottom thereof. A heating element 13 is disposed at the bottom of the housing 12 and is actuatable from an OFF position to an ON position by rotation of a dial 18 on the front of the housing 12. The heating means serves to heat the water within the housing 12 to produce steam to heat the contents of the bottle 16. The heating element 13 may be any type of heating element known in the art, such as a resistive heating element. In an embodiment, the dial 18 includes an automatic timer that automatically turns off the heating element after a pre-set duration sufficient to warm the contents of the bottle 16 to an optimum temperature for feeding.

Figure 2:
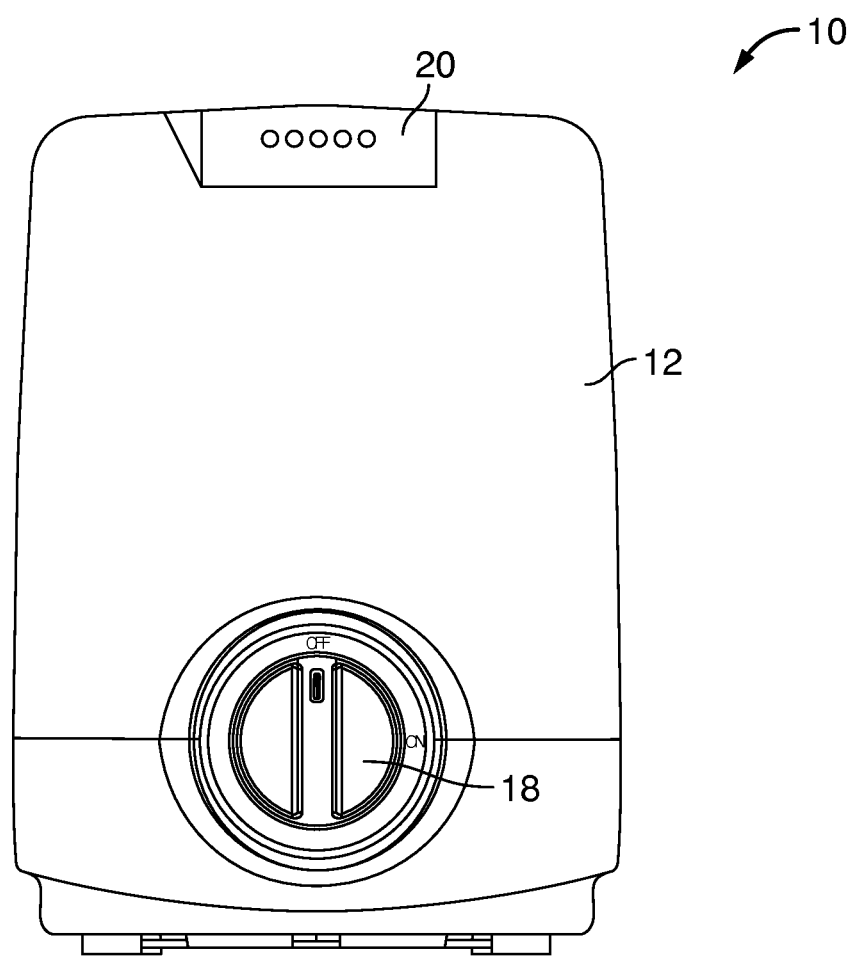
FIG. 2 is a front elevational view of the bottle warming device of FIG. 1.
Figure 3:
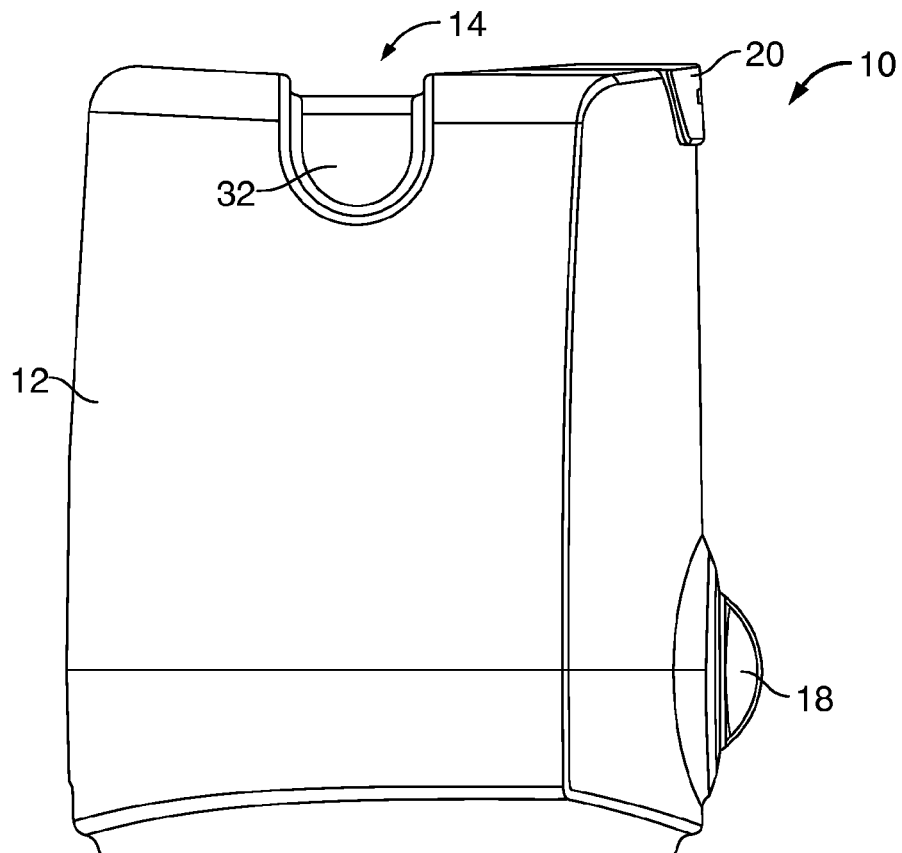
FIG. 3 is a left-side elevational view of the bottle warming device of FIG. 1.

As shown in FIG. 2, the bottle warming device 10 includes an integrated measuring cup 20 received in a recess in the housing 12. The measuring cup 20 is easily accessible by a user to pour a measured quantity of water into the housing 12. In addition, the bottle warming device 10 includes a built-in nightlight (not shown) that is actuatable via a button 22 located on the top surface of the housing 12. In an embodiment, the nightlight is located within the housing 12 so as to illuminate the bottle 16 and the contents thereof to make nighttime feedings easier. In another embodiment, the nightlight is located within the housing so as to illuminate the dial and the measuring cup on the front face of the device.

Figure 4:
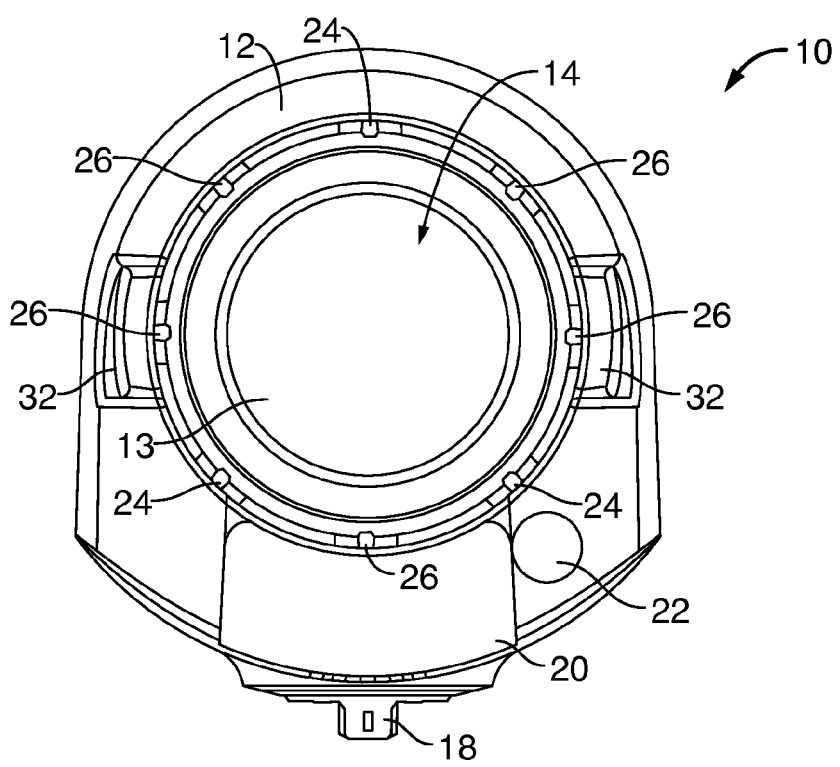
FIG. 4 is a top plan view of the bottle warming device of FIG. 1.

As best shown in FIG. 4, the bottle-receiving opening 14 is defined by substantially cylindrical sidewalls. As shown therein, eight vertically extending slots are formed in the cylindrical sidewalls of opening 14. In particular three long slots 24 are formed in the sidewalls. A first long slot 24 is oriented at an angular orientation of 0 degrees (adjacent the back of the housing 12 and opposite the front of the housing; the top-most slot 24 in FIG. 4), and the other two long slots 24 are located at substantially 135 degrees and 225 degrees with respect to the first long slot. The remaining slots are short slots 26 and are located at approximately 45 degrees, 90 degrees, 180 degrees, 270 degrees and 315 degrees with respect to the first long slot 24. Importantly, the short slots 26 do not extend as deeply into the opening 14 as the long slots 24.

Turning now to FIGS. 5 and 6, the bottle warming device 10 further includes a bottle basket 28 that is dimensioned to fit within the opening 14 in the housing 12. As shown therein, the bottle basket 28 is generally cylindrical in shape and has a pair of handles 30 that are dimensioned to be received in handle recesses 32 in the outer walls of the housing 12. The basket 28 has numerous openings 34 in the bottom and sidewalls thereof to permit steam to pass therethrough, as discussed hereinafter. As best shown in FIG. 5, the basket 28 has three vertically extending ribs 36 on the sidewalls thereof that correspond in position to the three long slots 24 of the opening 14 (i.e., one at '0' degrees, one at 135 degrees and one at 225 degrees, respectively, when viewed from the top). The long slots 24 of the opening 14 and the ribs 36 of the basket 28 are dimensioned such that the top of the basket 28 sits substantially flush with the top of the housing 12 when the basket is received in the opening 14 and the ribs 36 are received in the long slots 24.

Figure 9:
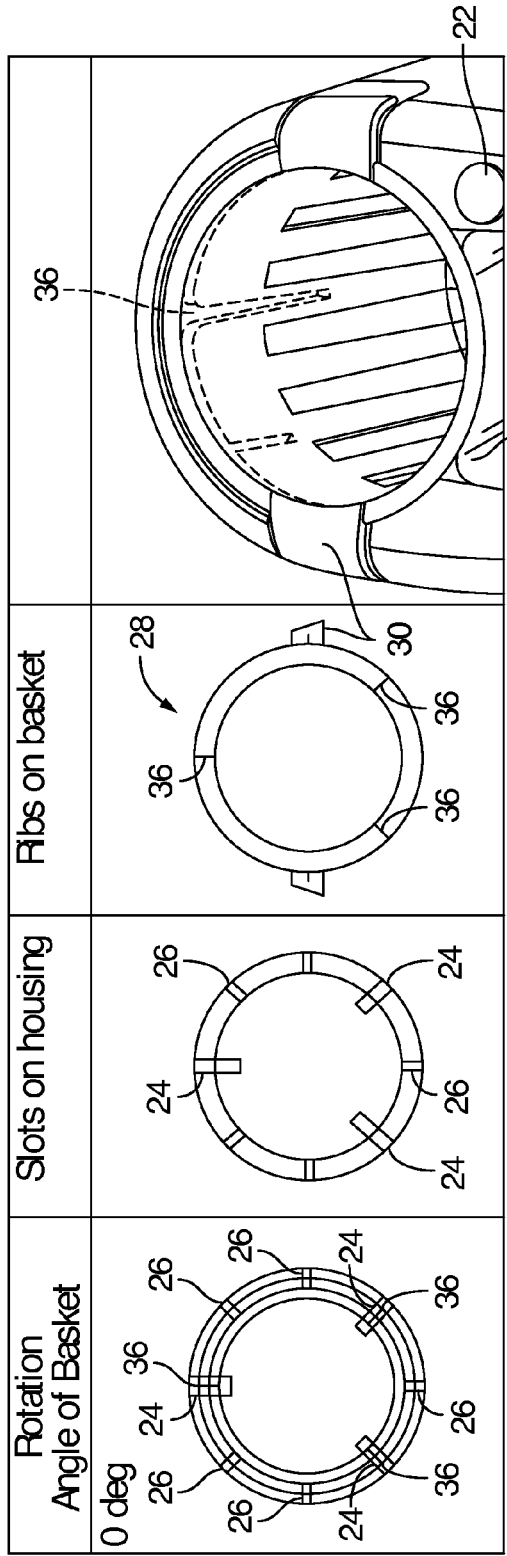
FIG. 9 is a diagram depicting an orientation of the bottle basket at 0 degrees with respect to the housing of the bottle warming device.

Turning now to FIG. 9-16, various positions of the basket 28 with respect to the housing are shown. As shown in FIG. 9, when the ribs 36 on the basket are aligned with the long slots 24 in the opening of the housing 12, the basket 28 is able to sit fully within the opening 14 such that the top of the basket 28 is generally flush with the top of the housing 12. In this position, the basket 28 is fully received within the opening 14 of the housing 12 such that a tall bottle may be warmed.

Figure 10:
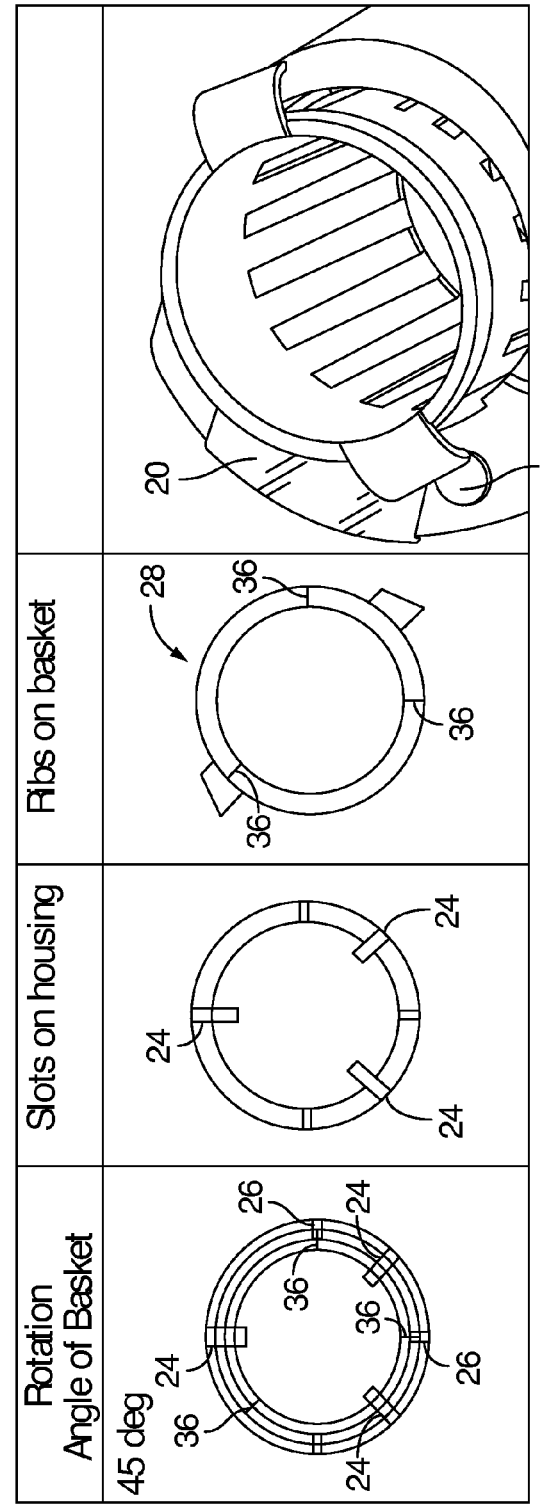
FIG. 10 is a diagram depicting an orientation of the bottle basket at 45 degrees with respect to the housing of the bottle warming device.

As shown in FIG. 10, if the basket 28 is rotated 45 degrees counterclockwise ('45 degree position') with respect to the housing 12, each of the ribs 36 will be received in short slots 26. Because the short slots 26 do not extend as deeply into the housing, downwards travel of the basket into the opening 14 is limited. As a result, the bottom of the basket 28 does not sit as far below the top surface of the housing 12 as it does when in the '0 degree' position of FIG. 9. In this position, a shorter bottle may be placed in the basket 28 to be warmed.

Figure 11:
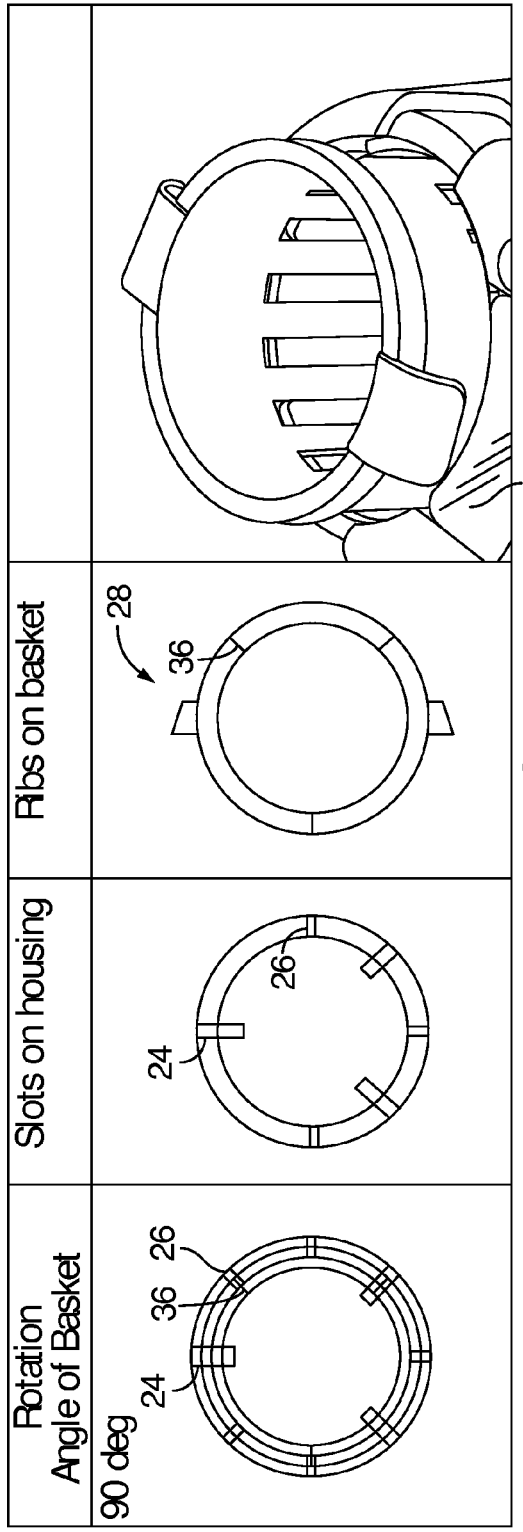
FIG. 11 is a diagram depicting an orientation of the bottle basket at 90 degrees with respect to the housing of the bottle warming device.
Figure 12:
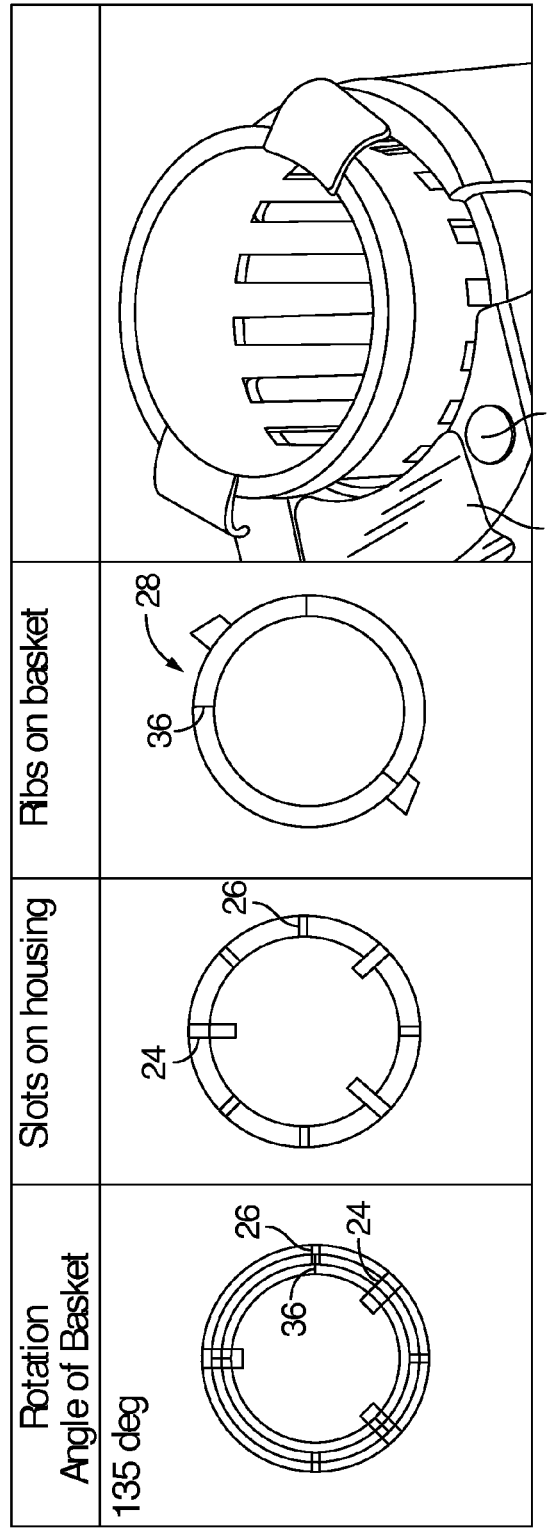
FIG. 12 is a diagram depicting an orientation of the bottle basket at 135 degrees with respect to the housing of the bottle warming device.

FIG. 11, depicts the basket 28 in a '90 degree' position. In this position, the basket is rotated 90 degrees counterclockwise with respect to the housing, such that one of the ribs 36 is received in a long slot 24 while the other two ribs are received in short slots 26. As the two short slots 26 prevent the basket 28 from reaching its fully seated position, the bottom of the basket 28 is in the same position as shown in FIG. 10, such that a short bottle may be accommodated.

FIGS. 12-16 illustrate the basket 28 at other degrees of rotation with respect to the housing 12. In particular, these figures illustrate the basket 28 in a '135 degree position,' a '180 degree position,' a '225 degree position,' a '270 degree position,' and a '315 degree position.' Notably, the basket 28 can only be fully received within the housing 12 when the three ribs 36 are received in the three long slots 24, i.e., in the 0 degree position. In all of the other positions, the basket 28 is in the elevated position such that a short bottle may be accommodated. As will be readily appreciated, by elevating the basket 28 for short bottles, access to the bottle for removal from the device is facilitated. In the absence of such a feature, short bottles would be difficult to retrieve from the bottom of the housing.

While FIGS. 1-16 show the bottle warming device 10 as having an opening with eight slots (3 long slots and 5 short slots) and a basket with three vertical ribs, an opening having more or fewer long and short slots and a basket with more or fewer vertical ribs is also possible and contemplated by the present invention.

With further reference to FIG. 1, the bottle warming device 10 may also include an adapter ring 38 that is received by the top of the basket 28. The adapter ring 38 has a smaller inner diameter than the basket 28 to more closely receive a bottle therethrough.

In operation, a user of the bottle warming device 10 plugs the device into a standard wall outlet. A measured quantity of water may then be poured into the housing 12 through the opening 14 using the integrated measuring cup 20. Depending on the size bottle to be warmed, a user may then place the basket in the '0 degree position,' for tall bottles, or in any of the other positions for short bottles. The adapter ring 38 may also be placed into position on the basket 28 to more closely receive the bottle 16. The user may then insert the bottle 16 into the basket 28 and rotate the dial 18 to the ON position. When in the ON position, the heating element 13 is energized to heat the water in the housing 12 to produce steam. The steam rises and travels through the openings 34 in the basket 28 to heat the contents of the bottle 16.]

With reference to FIGS. 7 and 8, the bottle warming device 10 of the present invention may also be utilized to heat jars of baby food and the like in a similar manner. In particular, the device 10 also includes a food jar basket 40 that may be utilized in place of the bottle basket 28. As shown in FIGS. 7 and 8, the food jar basket includes a lower basket portion 42 having a plurality of openings or apertures 44 therein through which steam may pass through, and a handle 46 attached to the lower basket portion 42. The food jar basket 40 is dimensioned so as to receive a jar of baby food therein and, like the bottle basket 28, is dimensioned so as to be received in the opening 14 in the housing 12.

While the bottle warming device 10 of the present invention is particularly adapted to warm the contents of baby bottles, the device may also be utilized with other bottles utilized for other purposes.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:
1. A bottle warming device, comprising:
   a housing;
   a heating element disposed in said housing;
   a basket receivable in said housing, said basket being movable between a first position in which a bottom of said basket is positioned a first distance from a top of said housing, and a second position in which said bottom of said basket is positioned a second distance from said top of said housing, said first distance being greater than said second distance;
   said basket being receivable in an opening in said housing, said opening having a plurality of vertically oriented long slots and a plurality of vertically oriented short slots; and wherein said basket has a plurality of vertically extending ribs configured to be received in said vertically oriented long slots and said vertically oriented short slots.

2. The bottle warming device of claim 1, further comprising:
a nightlight within said housing.

3. The bottle warming device of claim 1, wherein:
said basket is receivable in an cylindrical opening in said housing, said opening having three vertically oriented long slots at angular orientations of 0 degrees, 135 degrees and 225 degrees; and
wherein said basket has three vertically extending ribs positioned at angular orientations corresponding to the angular orientations of said long slots.

4. The bottle warming device of claim 3, wherein:
said opening has five vertically oriented short slots at angular orientations of 45 degrees, 90 degrees, 180 degrees, 270 degrees and 315 degrees.

5. The bottle warming device of claim 4, wherein:
in said first position said three vertically extending ribs are received in said three long slots, and in said second position at least one of said three vertically extending ribs is received in one of said short slots.

6. The bottle warming device of claim 1, further comprising:
a food jar basket dimensioned to be received in said housing.

7. The bottle warming device of claim 1, further comprising:
a rotatable dial electrically connected to said heating element and configured to transition said heating element from an OFF state to an ON state.

8. The bottle warming device of claim 7, wherein:
said rotatable dial includes an automatic timer.

9. The bottle warming device of claim 1, wherein:
said basket includes a plurality of apertures therein for the ingress of steam.

10. The bottle warming device of claim 1, further comprising:
a measuring cup received in said housing.

* * * * *